July 5, 1938.　　　A. P. FERGUESON　　　2,122,564
ORNAMENTAL FENDER SKIRT
Filed Oct. 9, 1936　　　2 Sheets-Sheet 1
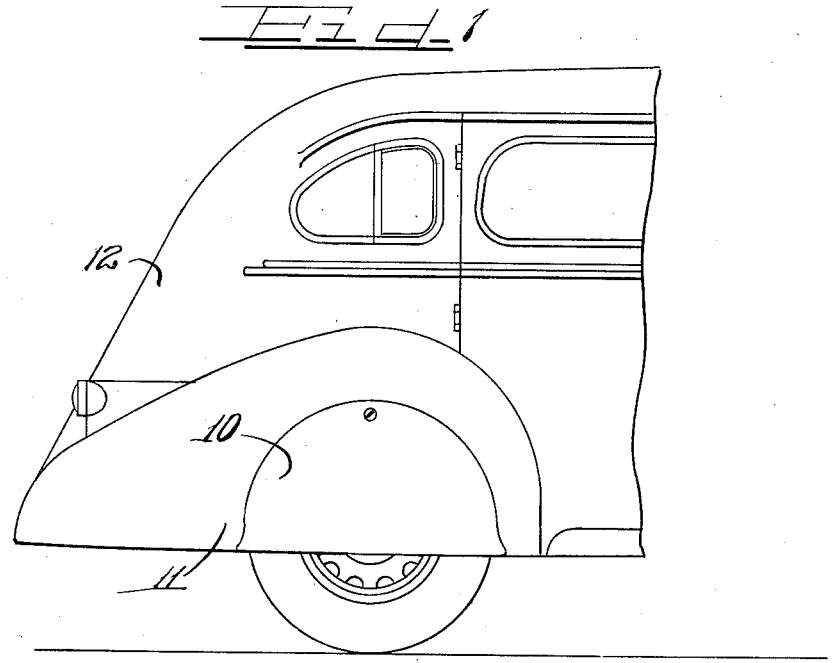
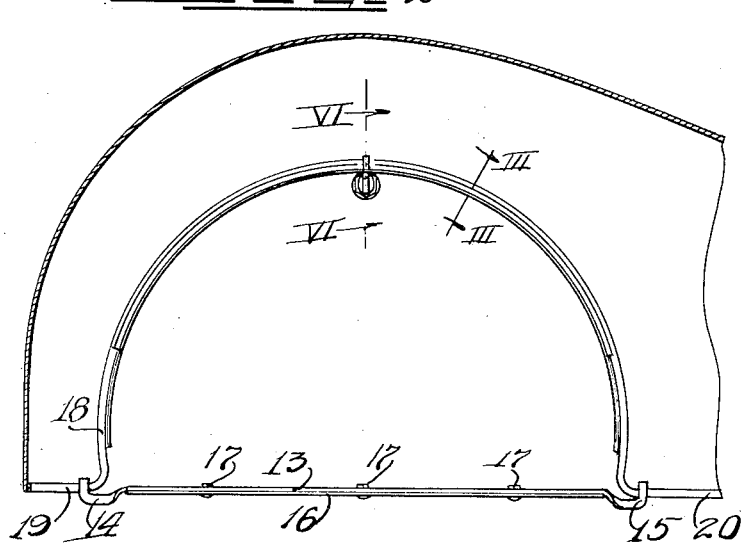

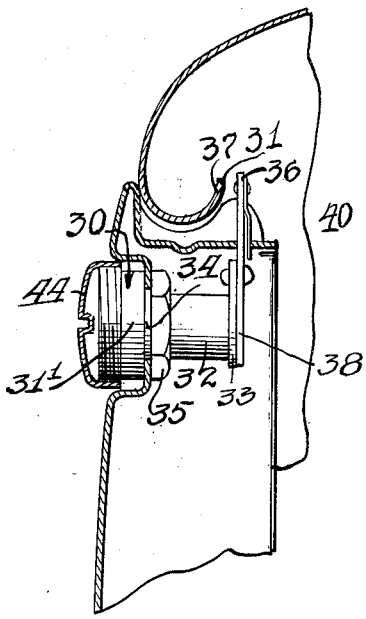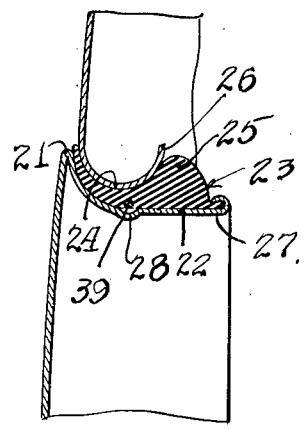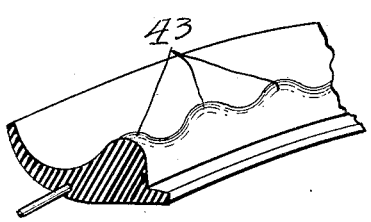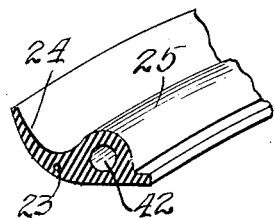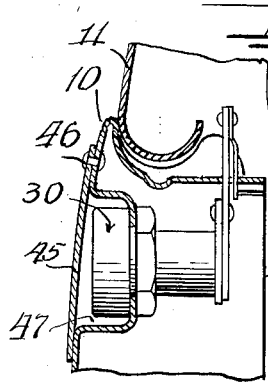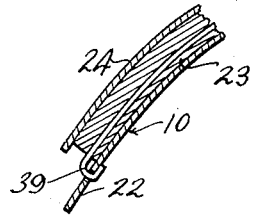

Patented July 5, 1938

2,122,564

UNITED STATES PATENT OFFICE 2,122,564

ORNAMENTAL FENDER SKIRT

Arthur P. Fergueson, Detroit, Mich., assignor, by mesne assignments, to Houdaille-Hershey Corporation, Detroit, Mich., a corporation of Michigan Application October 9, 1936, Serial No. 104,766

9 Claims. (Cl. 280—153)

This invention relates to ornamental fender skirts, and more particularly to a novel means for securing an ornamental fender skirt in position on a vehicle fender.

In designing ornamental fender skirts or shields of the type which are adapted to cover the usual wheel access opening in a vehicle fender, it is important that the means which is employed to secure the fender skirt in desired position be simple and quick to operate both in assembling the fender skirt on the vehicle fender and in removing it therefrom. It must also possess the desired degree of ruggedness when in use and be substantially free from vibration and noise.

It is an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel means for retaining the fender engaging edge portion of an ornamental fender skirt in desired position on a vehicle fender.

Another object of this invention is to provide a novel lock mechanism for preventing unauthorized removal of an ornamental fender skirt from the vehicle fender.

Another and further object of this invention is to provide a novel combination of vehicle fender and ornamental fender skirt.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of the rear part of an automobile having the usual form of vehicle fender and one embodiment of my novel ornamental fender skirt mounted thereon;

Figure 2 is a side elevational view, partly in cross section, of a vehicle fender and an ornamental fender skirt of the type illustrated in Figure 1, as viewed from the interior of the automobile body looking outwardly;

Figure 3 is an enlarged fragmentary view illustrating the novel fender engaging means carried on the ornamental fender skirt of Figure 1;

Figure 4 is a fragmentary perspective view of a slightly modified form of fender engaging means;

Figure 5 is a view similar to Figure 4, but illustrates a still further modification of the fender engaging means;

Figure 6 is an enlarged fragmentary view slightly in cross section illustrating in greater detail the lock mechanism shown on the ornamental fender skirt of Figures 1 and 2; and Figure 7 is a view similar to Figure 6, but illustrates a modified form of dust cap construction for the lock mechanism.

Figure 8 is a cross-sectional view of a portion of the fender skirt fastening flange.

In the embodiment of this invention illustrated in Figures 1 to 3 and 6 of the drawings, an ornamental fender skirt 10 of the trunnion supported type is mounted on a vehicle fender 11 of automobile 12. The bar 13 which extends beyond the fender skirt 10 at either end to form trunnion members 14 and 15 is secured to the underturned edge 16 of fender skirt 10 in any suitable manner, such as by bolts 17. Trunnion members 14 and 15 are shaped to extend around the opening defining underturned edge 18 of fender 11 into supporting engagement with underturned base edges 19 and 20 of fender 11.

The curved edge portion of fender skirt 10 is bent back on itself to form a fender engaging edge portion 21 and a rearwardly extending flange portion 22 (as may be seen best in Figure 3 of the drawings). Secured on the upper side of flange portion 22 is a non-metallic resilient strip 23 composed of any suitable non-metallic material such as rubber. Strip 23 includes an outwardly opening channel portion 24, which is adapted to be seated on the underturned opening defining edge 18 of fender 11, and a flange portion 25, which is adapted to engage the rearward face 26 of underturned marginal edge 18.

Strip 23 may be secured to flange portion 22 in any suitable manner. As shown in the drawings, strip 23 is provided with a rearwardly extending lip 27 about which the outer extremity of flange portion 22 is rolled. To further secure strip 23 to fender skirt 10, flange portion 22 is provided with a circumferentially disposed groove or depression 28. Strip 23 has a steel wire 29 embedded therein opposite groove 28. Opposite ends (not shown) of steel wire 29 are secured under slight tension to fender skirt 10 as shown in Figure 8, thereby causing a portion of the lower edge of strip 23 to be deformed into groove 28 of flange portion 22. This particular type of mounting prevents not only upward displacement of strip 23 but also lateral displacement thereof.

From the above description, it will readily be understood that fender skirt 10 may be mounted on vehicle fender 11 by inserting trunnion members 14 and 15 in underturned edges 19 and 20 of fender 11 and then rocking fender skirt 10 about the trunnion members into desired position. As the fender engaging edge portion 21 rocks into position, flange portion 25 of resilient strip 23 is deformed to a sufficient extent to pass under the underturned opening defining edge 18 of fender 11. As flange portion 25 of strip 23 passes under the lowermost point of underturned edge 18, the flange portion 25 resumes its normal shape due to the resiliency of the material and thus engages the rear face of underturned edge 18. Downward displacement of ornamental fender skirt 10 being prevented by trunnion members 14 and 15, and lateral movement of the curved edge portion of fender skirt 10 being prevented by fender engaging edge 21 and flange 25, fender skirt 10 is securely mounted on fender 11.

To dismount ornamental fender skirt 10 from fender 11, it is simply necessary to force the upper part of fender skirt 10 outwardly against the resilient action of flange portion 25 of strip 23 until flange portion 25 has passed beneath the lowermost point of underturned opening defining edge portion 18 of fender 11. The fender skirt 10 may then be lifted out of engagement with underturned base edges 19 and 20 of fender 11 and the ornamental fender skirt is completely dismounted.

In order to prevent unauthorized removal of fender skirt 10 from fender 11, a lock mechanism 30 is secured to the upper part of ornamental fender skirt 10 and includes a locking arm 31 which is adapted to extend upwardly from fender skirt 10 behind the rear face of underturned opening defining edge 18. Lock mechanism 30 may be of any suitable design, preferably key-operated, and includes a lock body 30', a key-operated rotatable cylinder 32, and an eccentric end plate 33. Lock body 30' and rotatable cylinder 32 extend through an aperture 34 in the upper part of ornamental fender skirt 10, the lock mechanism being firmly clamped in place by means of a clamping nut 35. Locking arm 31 of lock mechanism 30 is pivotally mounted to eccentric plate 33, as indicated in Figure 6 of the drawings. It will thus readily be understood that as rotatable cylinder 32 is moved about its axis, the locking end 36 of arm 31 is moved vertically, an aperture 37 being provided in rearwardly extending flange portion 22 through which locking arm 31 extends. Locking arm 31 includes a tail portion 38 which overlies the end face of the eccentric plate 33. This provision of a tail piece 38 on locking arm 31 tends to relieve the strain on the locking arm mounting stud 39, when an unauthorized attempt is made to remove fender skirt 10. Locking arm 31 may be biased against the front wall of the aperture 37, if desired, by means of a leaf spring 40 which is secured to locking arm 31 by means of a suitable rivet 41 and which extends downwardly through aperture 37 as indicated in the drawings.

In Figure 4 of the drawings I have illustrated a slightly modified form of strip for engaging the underturned opening defining edge of fender 11. The strip of non-metallic resilient material in this instance is formed with a longitudinally extending hole 42 therein. This provision of a longitudinal hole in flange 25 of strip 23 has the effect of lessening the amount of force necessary to deform flange 25 when flange 25 passes under the lowermost point of underturned opening defining edge 18.

A second modification of strip 23 is indicated in Figure 5 of the drawings. Instead of providing strip 23 with a continuous bead-like flange 25, it is provided with a plurality of protuberances 43 which operate in the same manner to engage the rear face of underturned opening defining edge 18 of fender 11 to retain ornamental fender skirt 10 in desired position thereon.

In some instances it has been found that the use of protuberances instead of a continuous solid flange or a continuous hollow flange is desirable. The provision of protuberances reduces the amount of force necessary to deform the strip but presents a more durable construction than that shown in Figure 4.

In order to prevent foreign matter, such as dust, from getting into the key aperture (not shown) of lock mechanism 30, it has sometimes been found desirable to provide a cover or closure member for the head of lock mechanism 30. In Figure 6 of the drawings, I have illustrated one form of dust cap at 44. As will readily be understood from the drawings, dust cap 44 is adapted to be screwed on the head of lock body 30'.

In Figure 7 of the drawings, I have illustrated a slightly modified form of dust cap construction which includes a flap 45 pivotally mounted by rivet 46 for movement along the surface of fender skirt 10. When access to the key aperture (not shown) of lock mechanism 30 is desired, it is simply necessary to rotate flap 45 about rivet 46 until the recess cavity 47 in which the head of lock mechanism 30 lies is open.

From the above description, it will be apparent that I have provided an extraordinarily simple means for securing an ornamental fender skirt to a vehicle fender. Although the ornamental fender skirt has been described as being of the trunnion supported type, it will be obvious to those skilled in the art that the fender skirt may be supported at its lower extremities in a wide variety of manners without departing from the spirit and scope of this invention. Furthermore, although the vehicle fender has been illustrated as being of the high crown type having underturned marginal edges, it is to be understood that the ornamental fender skirt may be employed with equal success with any type of fender having underturned marginal edges or the like.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. As an article of manufacture, an ornamental fender skirt having a fender engaging portion adapted to overlie the opening defining edge of a vehicle fender, a flange on said fender skirt in proximity to said fender engaging portion for extension rearwardly beneath said opening defining edge of said fender, and a non-metallic resilient strip secured to said flange, said strip being shaped to provide a channel portion adapted to be seated on said opening defining edge of said fender and a second beadlike fender fastening portion extending upwardly and continuing rearwardly from said channel portion forming a flange for engagement with the underside of said fender to restrain outward movement of said fender engaging portion of said skirt away from the opening defining edge of said fender.

2. As an article of manufacture, an ornamental fender skirt having a fender engaging portion adapted to overlie the opening defining edge of a vehicle fender, a flange on said fender skirt in proximity to said fender engaging portion for extension rearwardly beneath said opening defining edge of said fender, and a non-metallic resilient strip secured to said flange, said strip being shaped to provide a channel portion adapted to be seated on said opening defining edge of said fender and also shaped to provide a second flange portion having a plurality of protuberances thereon for engagement with the underside of said vehicle fender to restrain outward movement of said fender engaging portion of said skirt away from the opening defining edge of said fender.

3. As an article of manufacture, an ornamental fender skirt having a fender engaging portion adapted to overlie the opening defining edge of a vehicle fender, a flange on said fender skirt in proximity to said fender engaging portion adapted to extend rearwardly beneath said opening defining edge of said fender, and a non-metallic resilient strip disposed on said flange, said strip having a fastening flange portion adapted to engage the underside of said vehicle fender to retain said skirt in desired position on said fender, and said flange portion also having a rearwardly extending lip, the outer marginal edge of said first flange being bent back over said lip to secure said strip to said first flange.

4. As an article of manufacture, an ornamental fender skirt having a fender engaging portion adapted to overlie the opening defining edge of a vehicle fender, a flange on said fender skirt in proximity to said fender engaging portion adapted to extend rearwardly beneath said opening defining edge of said fender, said flange having a circumferential intermediate groove on the upper side thereof, and a non-metallic resilient strip secured to said flange, said strip having a wire embedded therein opposite said groove and secured and tensioned at opposite ends to said skirt, thereby deforming the lower portion of said strip into said groove, said strip also having an upwardly extending flange portion adapted to engage the underside of said vehicle fender.

5. With an ornamental fender skirt adapted for disposition on a vehicle fender over the wheel opening thereof, said fender having a downwardly extending portion, and including means for supporting said skirt in rocking engagement thereon whereby said skirt may be rocked into and out of desired position, a non-metallic resilient member secured along the fender engaging edge of said skirt, said member including a fastening flange portion having a series of hill and valley-like portions adapted to engage the rear underside of said downwardly extending portion to restrain outward rocking movement of said skirt away from said fender.

6. With an ornamental fender skirt adapted for disposition on a vehicle fender over the wheel opening thereof and including means for supporting said skirt thereon to permit angular movement of said skirt to and away from said fender, a non-metallic resilient member secured along the fender engaging edge of said skirt, said member including an outwardly opening channel portion adapted to be seated on the opening defining edge of said fender and a second bead-like portion extending upwardly and continuing rearwardly from said channel portion for engaging the underside of said fender to restrain outward angular movement of said skirt away from said fender.

7. As an article of manufacture, an ornamental fender skirt having a fender engaging edge and a fender supporting means thereon which permits said skirt to be rocked into and out of engagement with a vehicle fender having an underturned wheel opening defining edge, and securing means for restraining outward movement of the fender engaging edge of said skirt comprising a non-metallic resilient flange secured along a substantial portion of the fender engaging edge of said skirt and extending rearwardly under the opening defining edge of said fender and into engagement with the rear wall of said underturned opening defining edge, said resilient flange comprising the sole means for normally restraining outward movement of the fender engaging edge of said skirt away from the opening defining edge of said fender.

8. As an article of manufacture, an ornamental fender skirt having a fender supporting means thereon which permits such skirt to be rocked into and out of engagement with a vehicle fender having an underturned wheel opening defining edge, and securing means for restraining outward movement of the fender engaging edge of said skirt comprising a non-metallic resilient flange secured along a substantial portion of the fender engaging edge of said skirt and extending rearwardly under the opening defining edge of said fender, said flange having an outwardly opening channel portion adapted to be seated on the underturned opening defining edge of said fender, and a rear ridge-like portion for engagement with the rear wall of the underturned opening defining edge of said fender to restrain outward rocking movement of said skirt away from said fender.

9. As an article of manufacture, an ornamental fender skirt having a fender supporting means thereon which permits said skirt to be rocked into and out of engagement with a vehicle fender having an underturned wheel opening defining edge, and securing means for restraining outward movement of the fender engaging edge of said skirt comprising a non-metallic resilient flange secured along a substantial portion of the fender engaging edge of said skirt and extending rearwardly under the opening defining edge of said fender, said flange having an outwardly opening channel portion adapted to be seated on the underturned opening defining edge of said fender, and a rear irregularly shaped continuous ridge-like portion for engagement with the rear wall of the underturned opening defining edge of said fender to restrain outward rocking movement of said skirt away from said fender.

ARTHUR P. FERGUESON.